(12) United States Patent
Kim et al.

(10) Patent No.: US 12,394,363 B2
(45) Date of Patent: Aug. 19, 2025

(54) LIGHT EMITTING DISPLAY APPARATUS

(71) Applicant: LG Display Co., Ltd., Seoul (KR)

(72) Inventors: Sangmin Kim, Paju-si (KR); HyunHaeng Lee, Paju-si (KR); Yoochul Sung, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/486,457

(22) Filed: Oct. 13, 2023

(65) Prior Publication Data

US 2024/0221621 A1   Jul. 4, 2024

(30) Foreign Application Priority Data

Dec. 30, 2022   (KR) .......................... 10-2022-0190705

(51) Int. Cl.
*G09G 3/32* (2016.01)
*G06F 3/041* (2006.01)

(52) U.S. Cl.
CPC ............. *G09G 3/32* (2013.01); *G06F 3/0412* (2013.01); *G09G 2300/0426* (2013.01); *G09G 2300/0842* (2013.01)

(58) Field of Classification Search
CPC ............. G09G 3/32; G09G 2300/0426; G09G 2300/0842; G06F 3/0412
See application file for complete search history.

(56) References Cited

U.S. PATENT DOCUMENTS

| | | | |
|---|---|---|---|
| 2017/0038898 A1* | 2/2017 | Kim | G06F 3/0412 |
| 2019/0206971 A1* | 7/2019 | Kim | H10K 59/123 |
| 2021/0201810 A1* | 7/2021 | Feng | G11C 19/28 |
| 2023/0095733 A1* | 3/2023 | Yuan | G09G 3/3233 |
| | | | 345/206 |

FOREIGN PATENT DOCUMENTS

KR   10-2018-0131727 A   12/2018

OTHER PUBLICATIONS

Extended European Search Report dated Jun. 10, 2024 issued in Patent Application No. 23216717.1 (9 pages).

* cited by examiner

*Primary Examiner* — Kenneth B Lee, Jr.
(74) *Attorney, Agent, or Firm* — Fish & Richardson P.C.

(57) ABSTRACT

A light emitting display apparatus includes a first node electrode disposed in a rear surface of a substrate and connected to a gate of a first driving transistor of a first pixel, an first source electrode disposed on the same layer as a gate of the first driving transistor, overlapping the first gate electrode, and connected to a first electrode of a first light emitting device, a first switching transistor connected to a first gate line, and a first sensing transistor connected to a gate of the first switching transistor, wherein the first gate electrode is disposed between the rear surface of the substrate and the first source electrode.

13 Claims, 13 Drawing Sheets

LIGHT EMITTING DISPLAY APPARATUS

CROSS-REFERENCE TO RELATED APPLICATIONS

This application claims the benefit of the Korean Patent Application No. 10-2022-0190705 filed on Dec. 30, 2022, which is hereby incorporated by reference as if fully set forth herein.

BACKGROUND

Field of the Disclosure

The present disclosure relates to a light emitting display apparatus.

Discussion of the Related Art

A light emitting display apparatus is mounted on electronic products such as televisions, monitors, notebook computers, smart phones, tablet computers, electronic pads, wearable devices, watch phones, portable information devices, navigation devices, extended reality (XR) headsets, or vehicle head unit to display images.

Light emitting display apparatuses self-emit light to display an image.

SUMMARY

A light emitting display apparatus may include various types of touch panels. For example, a touch panel and a light emitting display panel may be independently manufactured and then the touch panel may be attached to a front of the light emitting display panel, or the touch panel may be formed using a cathode of the light emitting display panel.

In some aspects, when the touch panel is attached to the light emitting display panel, a manufacturing process of a light emitting display apparatus may be complicated. Moreover, it is difficult to form a touch panel by using a cathode in a light emitting display apparatus using a bottom light emitting method.

In some aspects, a light emitting display apparatus in which any one of electrodes provided in a light emitting display panel of a bottom emission type may be used as a touch electrode is disclosed.

Accordingly, the present disclosure is directed to providing a light emitting display apparatus that substantially obviates one or more problems due to limitations and disadvantages of the related art.

An aspect of the present disclosure is directed to providing a light emitting display apparatus in which a gate node electrode connected to a gate of a driving transistor of a light emitting display panel is used as a touch electrode. In this case, the light emitting display panel is configured as a bottom emission type and provided in a portion adjacent to a front surface of the light emitting display panel.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus including a first gate node electrode disposed in a rear surface of a substrate and connected to a gate of a first driving transistor of a first pixel, a first source node electrode disposed on the same layer as a gate of the first driving transistor, overlapping the first gate node electrode, and connected to a first electrode of a first light emitting device, a first switching transistor connected to a first gate line, and a first sensing transistor connected to a gate of the first switching transistor, wherein the first gate node electrode is disposed between the rear surface of the substrate and the first source node electrode.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
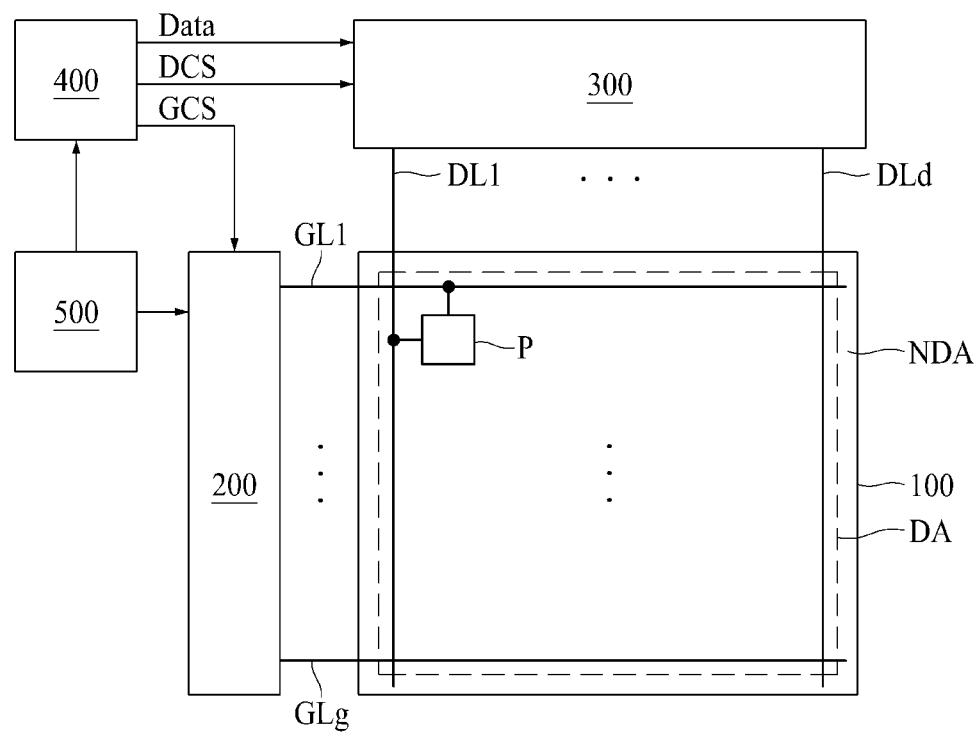
FIG. 1 is an example diagram illustrating a configuration of a light emitting display apparatus according to an aspect of the present disclosure.

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on." "over," "under," and "next," one or more other parts may be disposed between the two parts unless a more limiting term, such as "just" or "direct(ly)" is used.

In describing a time relationship, for example, when the temporal order is described as, for example, "after." "subsequent," "next," and "before," a case that is not continuous may be included unless a more limiting term, such as "just," "immediate(ly)," or "direct(ly)" is used.

It will be understood that, although the terms "first." "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer may not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art may sufficiently understand. The of the present disclosure may be carried out independently from each other or may be carried out together in co-dependent relationship.

Hereinafter, aspects of the present disclosure will be described in detail with reference to the accompanying drawings.

Figure 2:
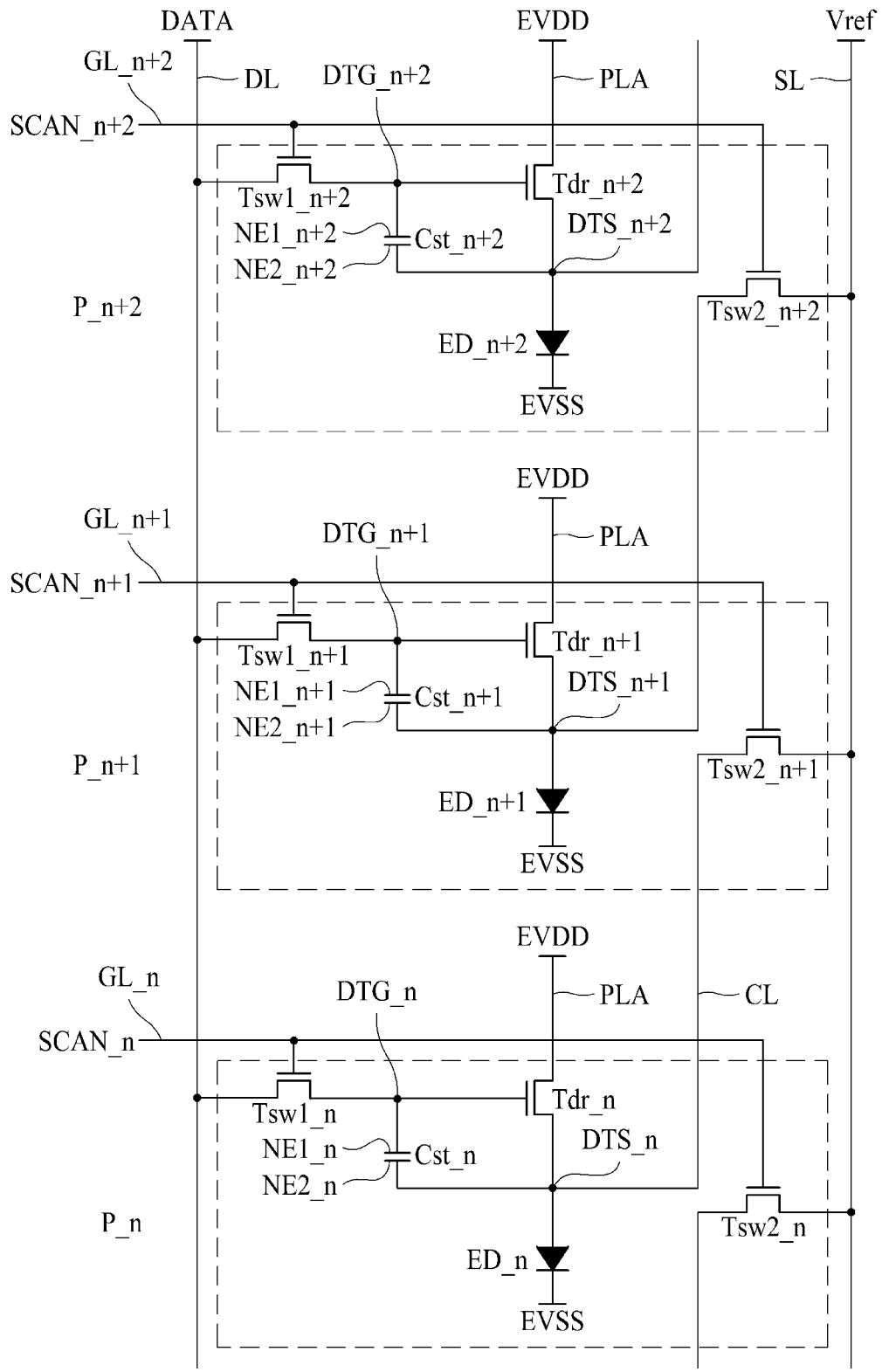
FIG. 2 is an example diagram illustrating a structure of a pixel applied to a light emitting display apparatus according to an aspect of the present disclosure.
Figure 3:
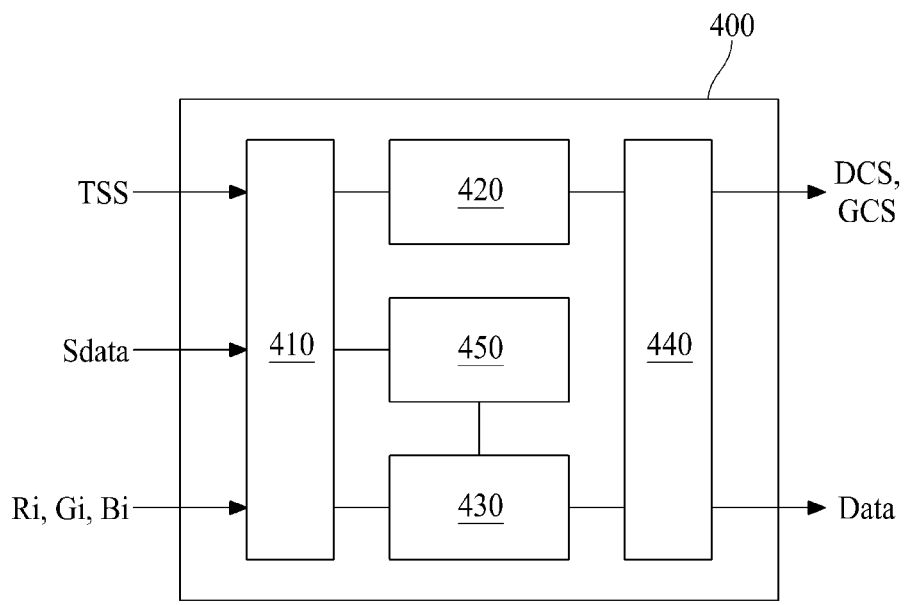
FIG. 3 is an example diagram illustrating a structure of a control driver applied to a light emitting display apparatus according to an aspect of the present disclosure.
Figure 4:
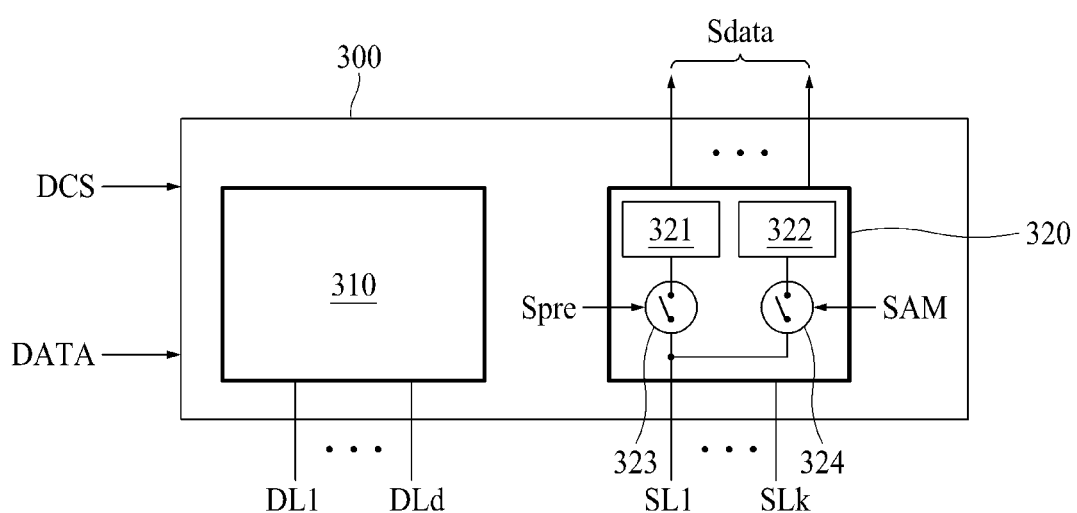
FIG. 4 is an example diagram illustrating a structure of a data driver applied to a light emitting display apparatus according to an aspect of the present disclosure.

FIG. 1 is an example diagram illustrating a configuration of a light emitting display apparatus according to an aspect of the present disclosure, FIG. 2 is an example diagram illustrating a structure of a pixel applied to a light emitting display apparatus according to an aspect of the present disclosure, FIG. 3 is an example diagram illustrating a structure of a control driver applied to a light emitting display apparatus according to an aspect of the present disclosure, and FIG. 4 is an example diagram illustrating a structure of a data driver applied to a light emitting display apparatus according to an aspect of the present disclosure.

The light emitting display apparatus according to an aspect of the present disclosure may configure various kinds of electronic devices. The electronic devices may be, for example, smartphones, tablet personal computers (PCs), televisions (TVs), and monitors.

The light emitting display apparatus according to an aspect of the present disclosure, as illustrated in FIG. 1, may include a display panel 100 which includes a display area DA displaying an image and a non-display area NDA provided outside the display area DA, a gate driver 200 which supplies gate signals to a plurality of gate lines GL1 to GLg provided in the display area DA of the display panel 100, a data driver 300 which supplies data voltages to a plurality of data lines DL1 to DLd provided in the display panel 100, a control driver 400 which controls driving of the gate driver 200 and the data driver 300, and a power supply 500 which supplies power to the control driver 400, the gate driver 200, the data driver 300 and the light emitting display panel 100.

The light emitting display panel 100 includes a display area DA and a non-display area NDA. Gate lines GL1 to GLg, data lines DL1 to DLd, and pixels P are provided in the display area DA. Accordingly, an image is output in the display area DA. In this case, g and d are natural numbers. The non-display area NDA surrounds the outer periphery of the display area DA.

The pixel P included in the light emitting display panel 100 may include a switching transistor, a storage capacitor, a driving transistor, a sensing transistor, and a light emitting device. In FIG. 2, an nth pixel P_n, an n+1th pixel P_n+1, and an second pixel P_n+2 are illustrated. Therefore, reference numerals of switching transistors, storage capacitors, driving transistors, sensing transistors, and light emitting devices are illustrated differently depending on the order of pixels.

In the following description, when switching transistors, storage capacitors, driving transistors, sensing transistors, and light emitting devices do not need to be differentiated by pixel, Tsw1, Cst, Tdr, Tsw2, and ED may be used as reference numeral for switching transistors, storage capacitors, driving transistors, sensing transistors, and light emitting devices. However, when it is necessary to differentiate switching transistors, storage capacitors, driving transistors, sensing transistors, and light emitting devices by pixel, reference numerals as illustrated in FIG. 2 may be used.

Moreover, in the following descriptions, a switching transistor Tsw1, a storage capacitor Cst, a driving transistor Tdr, and a sensing transistor Tsw2 may be included in a pixel driving unit. That is, the light emitting device ED may be connected to the pixel driving unit.

A first terminal of a driving transistor Tdr may be connected to a first voltage supply line PLA that is supplied with a first voltage EVDD, and a second terminal of the driving transistor Tdr may be connected to the light emitting device ED.

A first terminal of a switching transistor Tsw1 may be connected to the data line DL, a second terminal of the switching transistor Tsw1 may be connected to a gate of the driving transistor Tdr, and a gate of the switching transistor Tsw1 may be connected to the gate line GL.

A data voltage Vdata may be supplied through the data line DL from the data driver 300. A scan signal SCAN may be supplied through the gate line GL from the gate driver 200. The scan signal SCAN may include a gate pulse GP for turning on the switching transistor Tsw1 and a gate-off signal for turning off the switching transistor Tsw1.

The light emitting device ED may include a first electrode supplied with a first voltage EVDD through the driving transistor Tdr, a second electrode supplied with a second voltage EVSS, and a light emitting layer provided between the first electrode and the second electrode. The first electrode of the light emitting device ED may be an anode, and the second electrode of the light emitting device ED may be a cathode.

A sensing line SL may be connected to the data driver 300 and may be connected to the power supply 500 through the data driver 300.

For example, a reference voltage Vref from the power supply 500 may be supplied to pixels P through the sensing line SL, and pixel sensing signals transmitted through the sensing line SL from the pixels may be converted into pixel sensing data with digital values in the data driver 300.

In some aspect, touch sensing signals may be transmitted from pixels P through the sensing line SL during a touch period and may be converted into touch sensing data Sdata with digital values in the data driver 300. The pixel sensing data and the touch sensing data Sdata may be transmitted to the control driver 400 and processed.

A first terminal of a sensing transistor Tsw2 may be connected to a second terminal of the driving transistor Tdr and a light emitting device ED, which are provided in a previous pixel. A second terminal of the sensing transistor Tsw2 may be connected to the sensing line SL, and a gate of the sensing transistor Tsw2 may be connected to the gate line GL.

For example, a first terminal of an n+1th sensing transistor Tsw2_$n$+1 may be connected to a second terminal of an nth driving transistor Tdr_n and an nth light emitting device ED_n of the nth pixel P_n. A second terminal of an n+1th sensing transistor Tsw2_$n$+1 may be connected to the sensing line SL, and a gate of an n+1th sensing transistor Tsw2_$n$+1 may be connected to a n+1th gate line GLn+1.

Accordingly, a gate of an n+1th switching transistor Tsw1_$n$+1 may be connected to the gate of the n+1th sensing transistor Tsw2_$n$+1. A scan signal SCAN may be supplied to the n+1th gate line GLn+1 during the display period, and the scan signal SCAN may be supplied during the touch period.

Details related to the connection of the sensing transistor Tsw2 will be described with reference to FIGS. 5A to 6.

The structure of the pixel P applied to the present disclosure is not limited to the structure illustrated in FIG. 2. Accordingly, the structure of the pixel P may be changed to various shapes.

The control driver 400 may realign input image data Ri, Gi, and Bi, which transferred from an external system, by using a timing synchronization signal transferred from the external system. The control driver 400 may generate a data control signal DCS to be supplied to the data driver 300 and a gate control signal GCS to be supplied to the gate driver 200.

In an aspect illustrated in FIG. 3, the control driver 400 may include a control unit 410, a control signal generator 420, data aligner 430, an output unit 440, and a storage unit 450. In one aspect, the data aligner is configured to realign input image data Ri, Gi, and Bi, generate image data Data and supply the image data Data to the data driver 300. The control signal generator 420 is configured to generate the gate control signal GCS and the data control signal DCS using the timing synchronization signal. For example, the control unit 410 receives the timing synchronization signal and the input image data from the external system, transfers the timing synchronization signal to the control signal generator, and transfers the input video data to the data aligner. The output unit 440 is configured to supply the data driver 300 with the image data Data generated by the data aligner 430 and the data control signal DCS generated by the control signal generator 420. The output unit 440 also supplies the gate driver 200 with the gate control signal GCS generated by the control signal generator 420.

In some aspects, the control unit 410 may determine the presence or absence of a touch and a touch location of the light emitting display panel 100 by using touch sensing data Sdata that is transmitted from the data driver 300 during the touch period.

The control driver 400 may further include a storage unit 450 for storing various information. The storage unit 450 may be included in the control driver 400 as illustrated in FIG. 3 but may be separated from the control driver 400 and provided independently.

In this aspect, the external system may drive the control driver 400 and an electronic device. For example, when the electronic device is a TV, the external system may receive various kinds of sound information, image information, and letter information over a communication network and may transmit the received image information to the control driver 400. That is, the external system may change the image information received through the communication network into a signal recognized by the control driver 400. In this case, the signals recognized by the control driver 400 may be input image data Ri, Gi, and Bi. That is, the external system may convert image information into input image data Ri, Gi, and Bi, and the input image data Ri, Gi, and Bi may be transmitted to the control driver 400.

The power supply 500 may generate various power sources and supply the generated power sources to the control driver 400, the gate driver 200, the data driver 300, and the light emitting display panel 100.

The gate driver 200 may be directly embedded into the non-display area NDA by using a gate-in panel (GIP) type. Moreover, the gate driver 200 may be provided in the display area DA in which light emitting devices ED are provided or may be provided on a chip-on film mounted in the non-display area NDA.

The gate driver 200 may supply gate pulses to the gate lines GL1 to GLg.

When a gate pulse generated by the gate driver 200 is supplied to a gate of a switching transistor Tsw1 included in the pixel P, the switching transistor Tsw1 may be turned on. When the switching transistor is turned on, data voltage Vdata is supplied to the pixel P through the data line.

When a gate-off signal is generated by the gate driver 200 and supplied to the switching transistor Tsw1, the switching transistor Tsw1 may be turned off. When the switching transistor Tsw1 is turned off, a data voltage may not be supplied to the pixel P.

The gate signal GS supplied to the gate line GL may include the gate pulse and the gate-off signal.

Finally, the data driver 300 may supply data voltages to the data lines DL1 to DLd during the display period, and thus, an image may be displayed on the light emitting display panel 100.

During a touch sensing period, the data driver 300, for example, may transmit data voltages Vdata corresponding to a black image to data lines DL1 to DLd, supply touch sensing voltages to sensing lines SL, receive touch sensing signals from the sensing lines SL, convert the touch sensing signals into touch sensing data Sdata, and transmit the touch sensing data Sdata to the control driver 400.

To this end, the data driver 300, as illustrated in FIG. 4, may include a data voltage generator 310, which generates data voltages Vdata and transmit the data voltage Vdata to the data lines DL1 to DLd, and a touch sensing unit 320, which supplies touch sensing voltages to the sensing lines SL1 to SLk during the touch period and converts the touch sensing signals received from the pixels P through the sensing lines SL1 to SLk into the sensing data Sdata.

In this case, k may be a natural number less than or equal to d. That is, the number of the sensing lines SL may be the same as or less than the number of the data lines DL. For example, when a red pixel, a green pixel, a blue pixel, and a white pixel configures a unit pixel, a sensing line SL may be provided in each unit pixel. In this case, the number of sensing lines SL may be less than the number of data lines DL.

The touch sensing unit 320 may include a touch sensing voltage generator 321 configured to supply touch sensing voltages to sensing lines SL1 to SLk during the touch period, a converter 322 configured to convert touch sensing signals received through sensing lines SL1 to SLk from pixels P into touch sensing data Sdata, a first switch 323 configured to connect the touch sensing voltage generator 321 to a sensing line SL, and a second switch 324 configured to connect the converter 322 to a sensing line SL.

The first switch 323 may be turned on or off by a first switch control signal Spre transmitted from the control driver 400, and the second switch 324 may be turned on or off by a second switch control signal SAM transmitted from the control driver 400.

The first switch control signal Spre and the second switch control signal SAM may be included in the data control signals DCS.

Figure 5A:
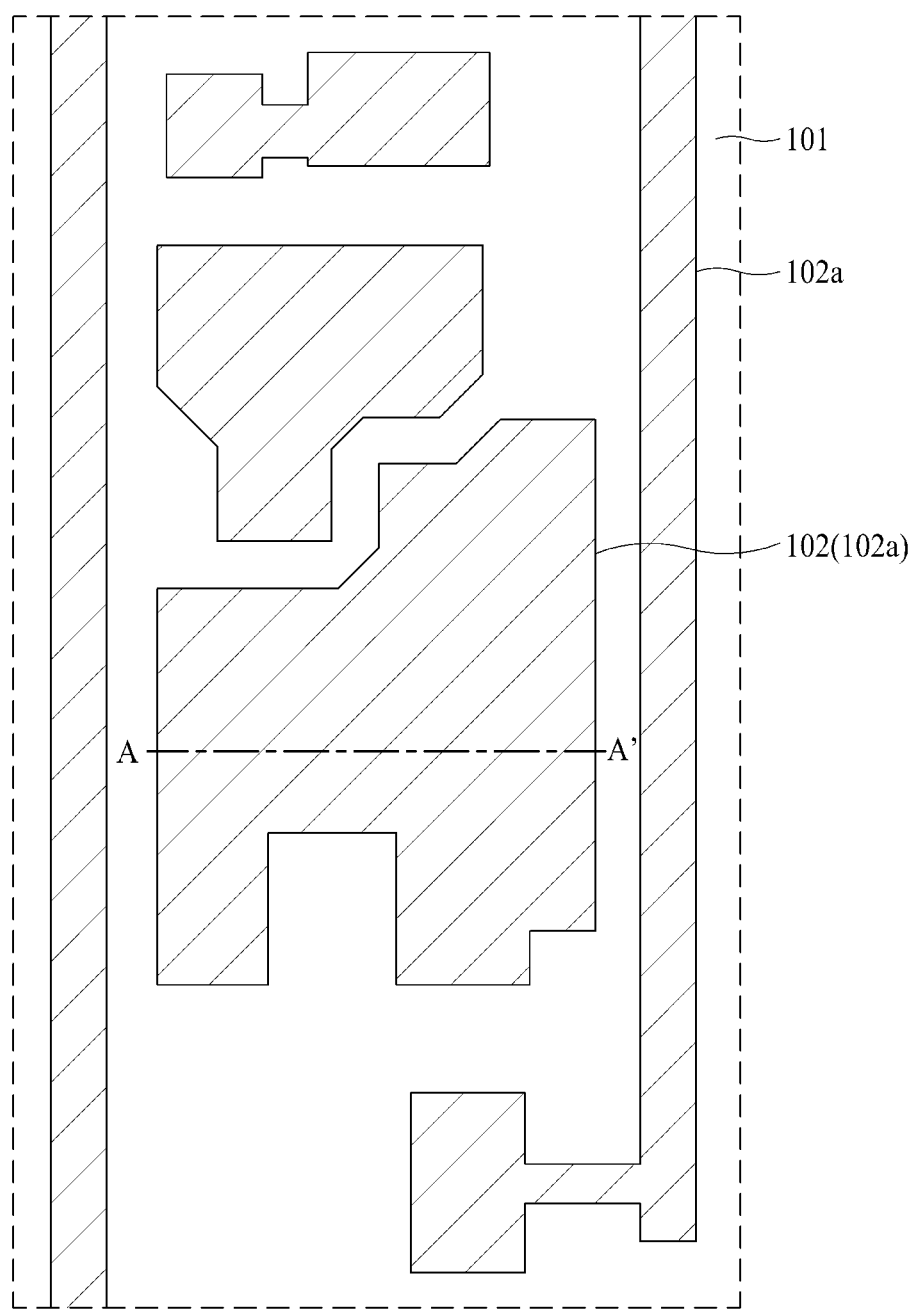
FIGS. 5A to 5F are plan views for describing a method of manufacturing a pixel driving unit applied to a light emitting display apparatus according to an aspect of the present disclosure.
Figure 5B:
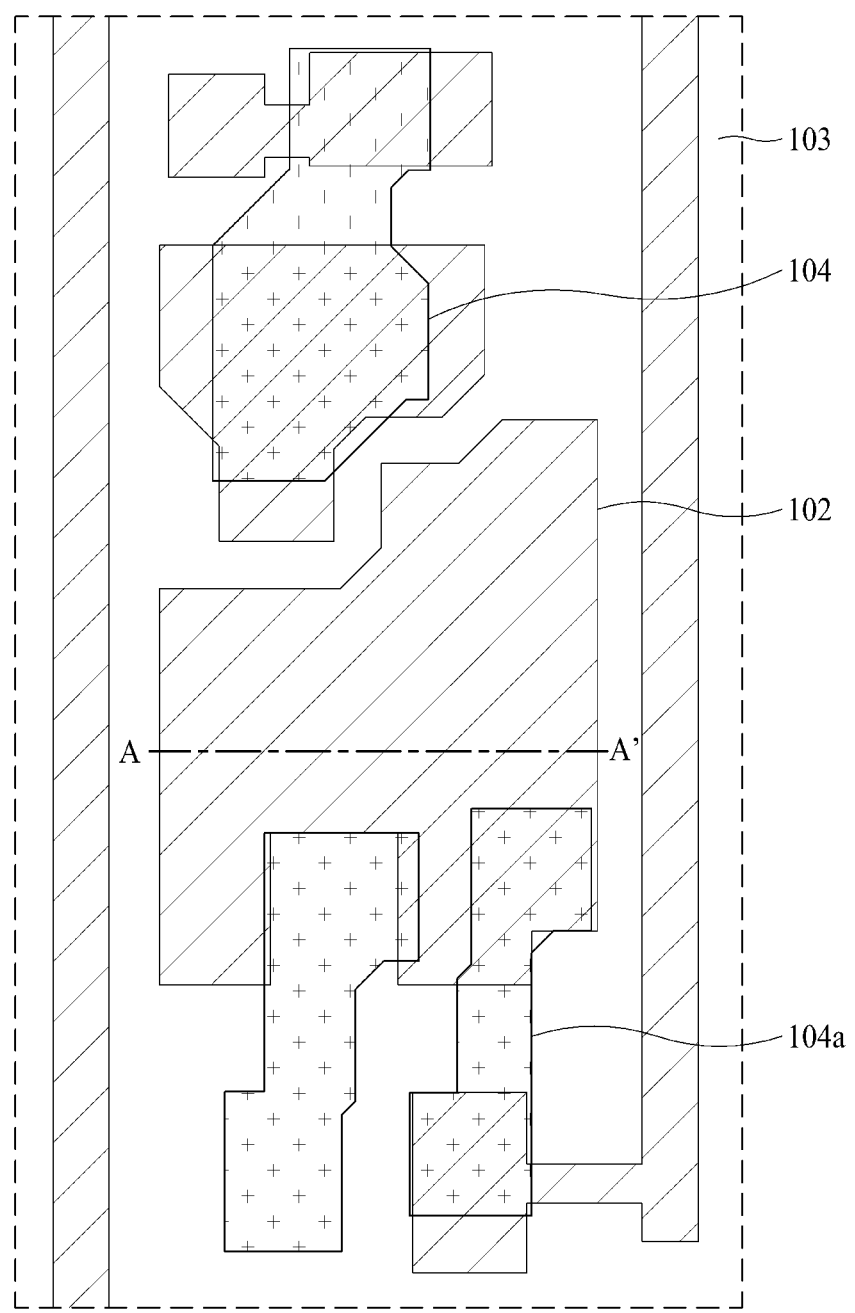
Figure 5C:
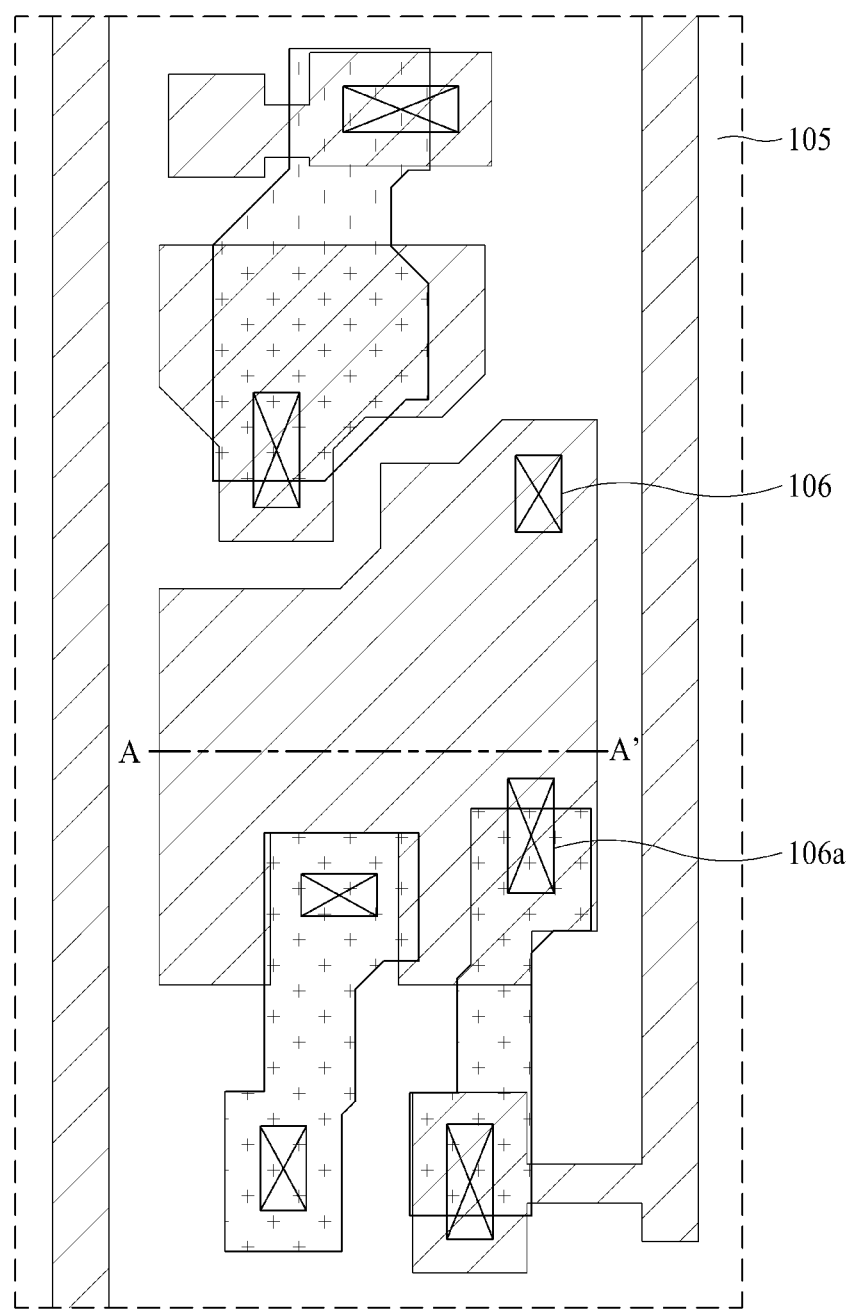
Figure 5D:
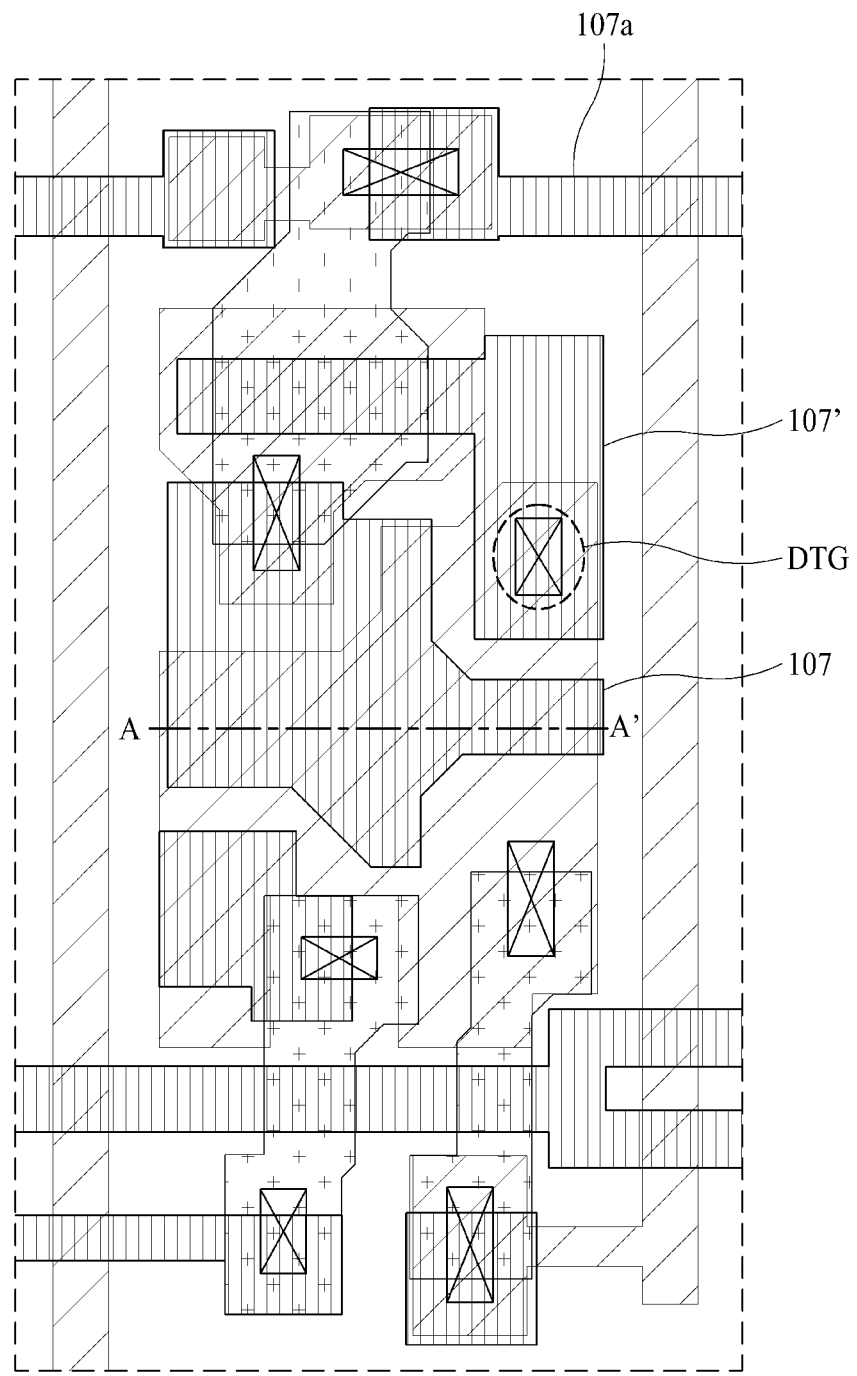
Figure 5E:
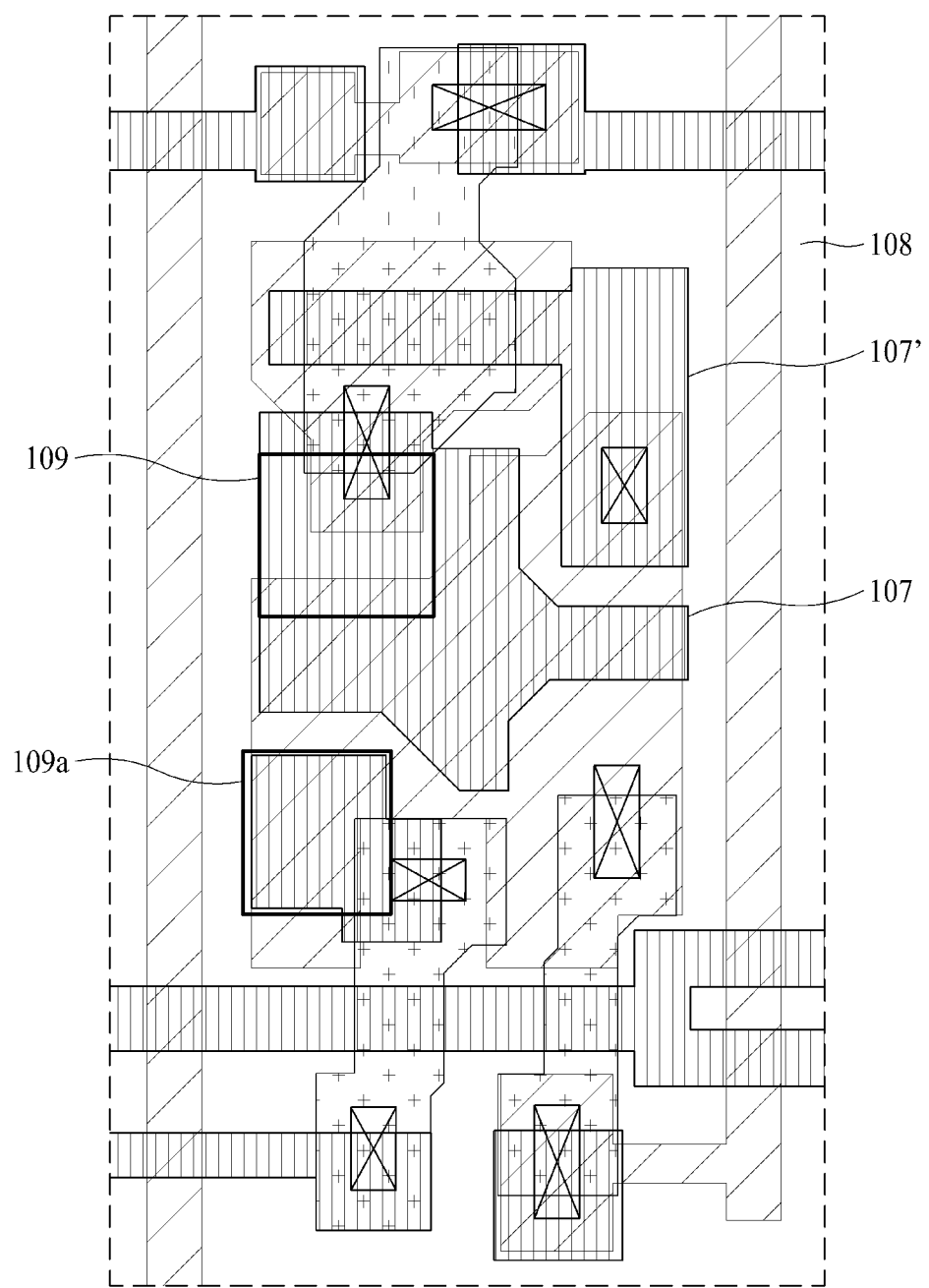
Figure 5F:
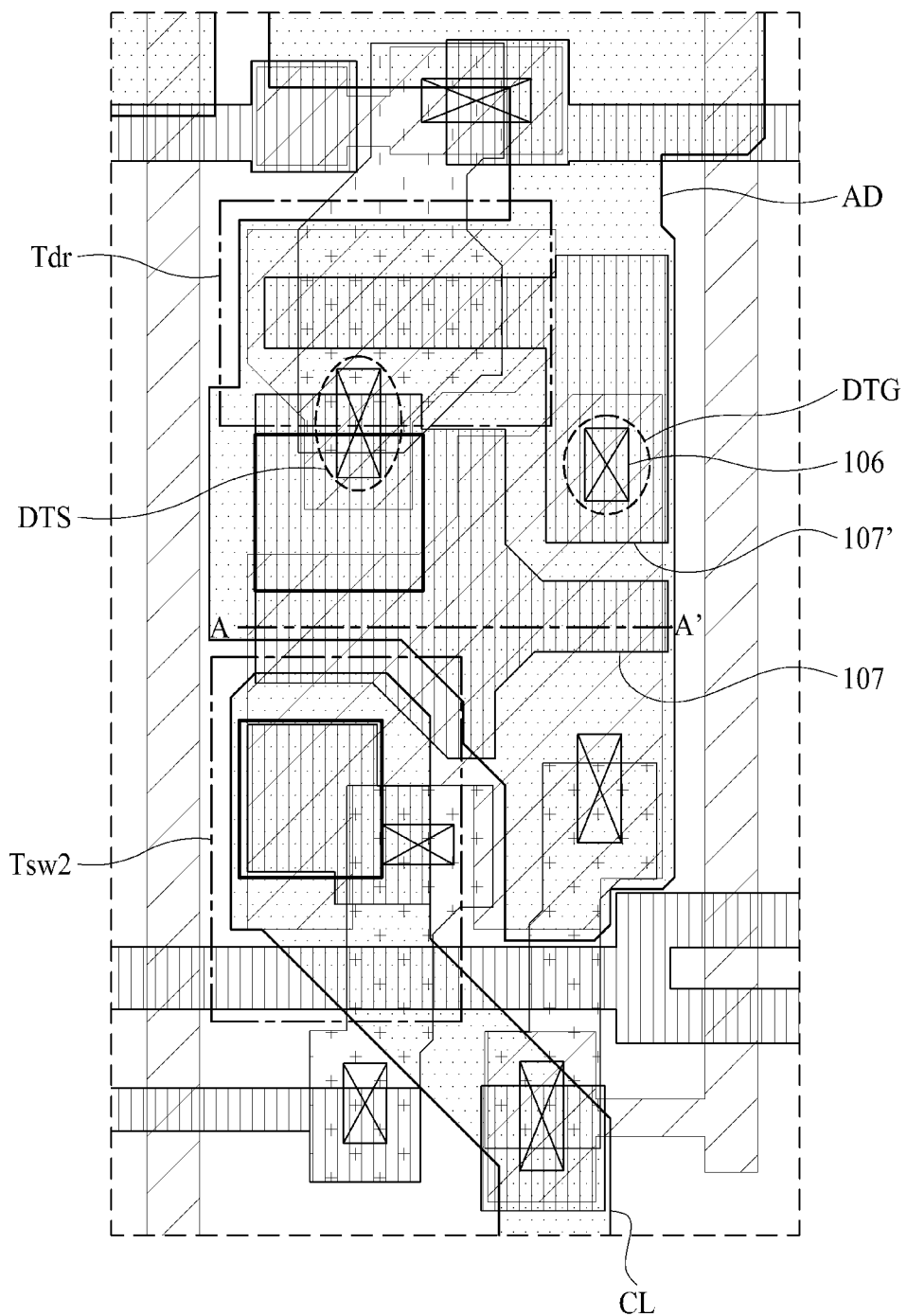
Figure 6:
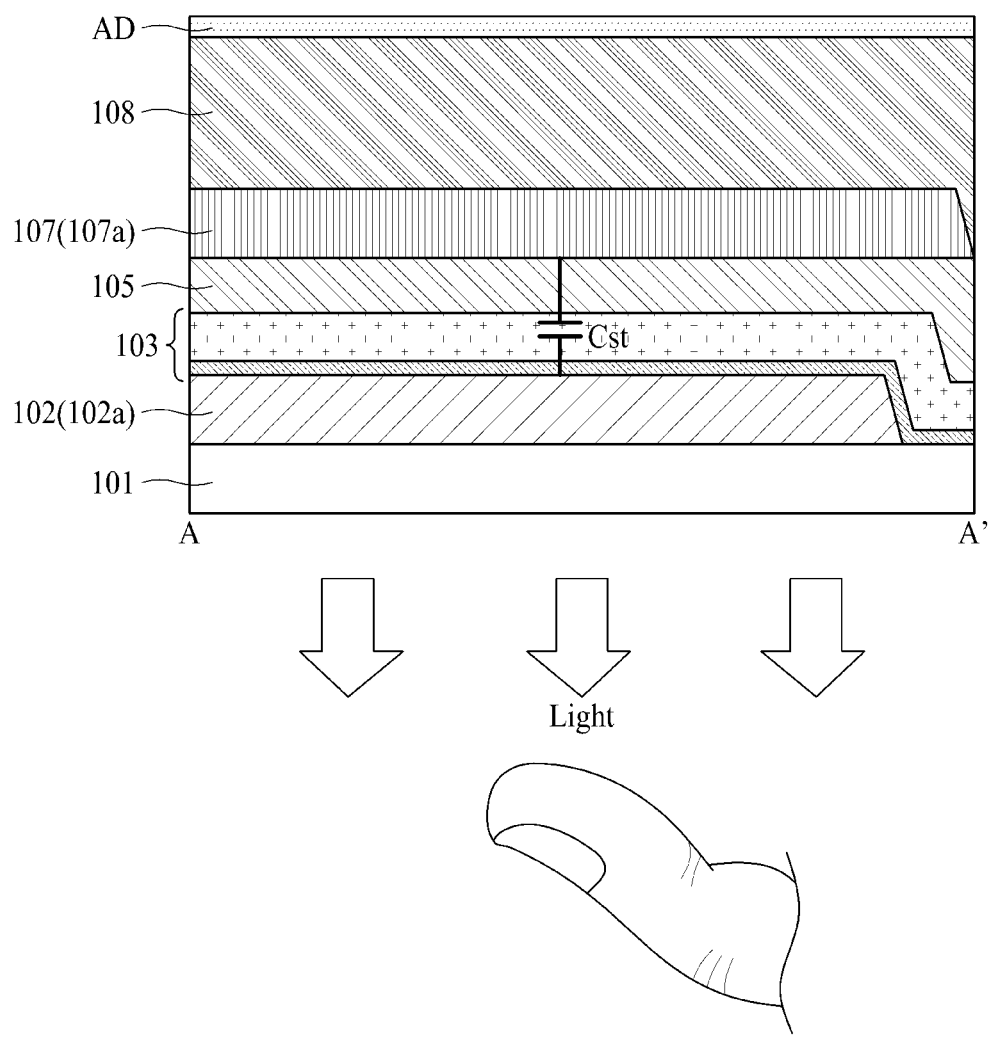
FIG. 6 is an example diagram illustrating a cross-sectional surface taken along line A-A' illustrated in FIG. 5F.

FIGS. 5A to 5F are plan views for describing a method of manufacturing a pixel driving unit applied to a light emitting display apparatus according to an aspect of the present disclosure and FIG. 6 is an example diagram illustrating a cross-sectional surface taken along line A-A' illustrated in FIG. 5F. That is, the plan view illustrated in FIG. 5F may be completed through the manufacturing processes illustrated in FIGS. 5A to 5E, and the cross-sectional surface taken along the A-A' line illustrated in FIG. 5F may be the cross-sectional surface illustrated in FIG. 6. In this case, line A-A' is illustrated in each of FIGS. 5A to 5E at the same position as the A-A' line illustrated in FIG. 5F. Moreover, FIGS. 5A to 5F illustrate an n+1th pixel P_n+1, and thus, an nth pixel P_n is provided at a lower end of the n+1th pixel P_n+1 illustrated in FIGS. 5A to 5F.

First, as illustrated in FIGS. 5A and 6, light blocking layers 102a may be formed on the substrate 101.

The light blocking layers 102a may be formed of a metal such as copper (Cu).

In some aspects, the light blocking layers 102a may form data lines DL, sensing lines SLs, and gate electrodes 102. In some aspects, a gate electrode 102 may be a first electrode of a touch electrode.

Next, a buffer 103 may be formed over to cover the light blocking layers 102a. Accordingly, as illustrated in FIG. 6, the gate electrode 102 may also be covered by the buffer 103. The buffer 103 may be formed of various inorganic materials such as silicon dioxide (SiO2) or silicone nitrate (SiNx) and may be formed of at least one layer.

Next, as illustrated in FIG. 5B, active layers 104 may be formed on an upper end of the buffer 103.

Some of the active layers 104a may be active regions of the driving transistor Tdr.

Next, as illustrated in FIG. 6, a gate insulation layer 105 may be formed over the substrate. Accordingly, the active layers 104a may be covered by the gate insulation layer 105.

Next, as illustrated in FIG. 5C, contact holes 106a may formed in the gate insulation layer 105.

Some of the contact holes 106a may be a gate contact hole 106 and exposes the gate electrode 102.

Next, as illustrated in FIGS. 5D and 6, gate layers 107a may be formed on an upper end of the gate insulation layer 105.

Some of the gate layers 107a may form gate lines GL, and other portions of the gate layers 107a may form gate 107' of the driving transistor Tdr, and other portions of the gate layers 107a may form a source electrode 107 of the driving transistor Tdr.

That is, a first terminal of the driving transistor Tdr may be a drain, and the drain of the driving transistor Tdr may be connected to the first voltage supply line PLA, as illustrated in FIG. 2.

A second terminal of the driving transistor Tdr may be a source, the source of the driving transistor Tdr may be connected to the light emitting device ED as illustrated in FIG. 2, and the source of the driving transistor Tdr may be connected to the source electrode 107 as illustrated in FIG. 6.

The gate 107' of the driving transistor Tdr may be connected to the gate electrode 102 through a gate contact hole 106 provided in the gate insulation layer 105.

That is, the gate electrode 102 may be exposed by the gate contact hole 106 in the gate insulation layer 105, and the gate 107' of the driving transistor Tdr provided on an upper end of the gate insulation layer 105 may be connected to the gate electrode 102 through the gate node contact hole 106.

In this case, a gate node DTG is formed between the gate 107' of the driving transistor Tdr and the gate electrode 102.

Next, as illustrated in FIGS. 5E and 6, the gate layers 107a may be covered by a planarization layer 108, and planarization layer contact holes 109a may be formed in the planarization layer 108.

Some of the planarization layer contact holes 109a may be source contact hole 109 that exposes the source electrode 107 connected to the second terminal of the driving transistor Tdr.

Next, as illustrated in FIGS. 5F and 6, an anode AD used as a first electrode of the light emitting device ED may be formed on an upper end of the planarization layer 108. The anode AD may be formed independently for each pixel.

The anode AD may be connected to the source electrode 107 through a source contact hole 109 in the planarization layer 108.

In this case, a node between the anode AD and the source electrode 107 may be a source node DTS, as illustrated in FIGS. 2 and 5F.

In some aspects, in a light emitting display apparatus according to the present disclosure, as illustrated in FIGS. 2 and 5F, a first terminal of a sensing transistor Tsw2 provided in the n+1th pixel P_n+1 may be connected to the source node DTS provided in the adjacent pixel (e.g., tenth pixel P_n) through a connection line CL.

Therefore, a touch sensing signal generated from the source node DTS provided in the nth pixel P_n may be transmitted to the data driver 300 through the connection line CL and the sensing transistor Tsw2 provided in the n+1th pixel P_n+1.

Finally, a bank may be provided to surround a periphery of an anode AD, a light emitting layer and a cathode may be formed on the substrate 101, and the cathode may be covered by a passivation layer, and thus, a light emitting display panel 100 may be manufactured.

As described above, the gate 107' of the driving transistor Tdr may be connected to the gate electrode 102 through the gate contact hole 106, and the source electrode 107 connected to the source of the driving transistor Tdr may be connected to the anode AD, which is a first electrode of the light emitting device ED, through the source node contact hole 109.

In this case, a node between the gate 107' of the driving transistor Tdr and the gate electrode 102 may be referred to as a gate node DTG, a node between a source of the driving transistor Tdr and the source electrode 107 may be referred to as a source node DTS, and the source node DTS may be disposed between the source electrode 107 and the light emitting device ED.

In the light emitting display panel 100 as described above, light generated from the light emitting device ED may be output in the front direction of the substrate 101. For example, a front surface of the substrate 101 may be configured to emit light and output an image. For example, in the light emitting display panel illustrated in FIG. 6, a front surface of the substrate 101 corresponds to a lower direction of the substrate 101. Accordingly, the configurations described above may be provided on a rear surface of the substrate 101, for example, in an upper direction of the substrate 101 illustrated in FIG. 6.

In this case, a user may view the image displayed through the front of the substrate 101, and thus, the user's touch may occur in the front direction of the substrate 101.

Hereinafter, features of a light emitting display apparatus according to the present disclosure with the structure described above will be described. In the following description, details which are the same as or similar to details described above are omitted or will be briefly described.

First, as illustrated in FIG. 2, a switching transistor Tsw1, a storage capacitor Cst, a driving transistor Tdr, a sensing transistor Tsw2, and a light emitting device ED may be provided in each of pixels P.

Particularly, an n+1th switching transistor Tsw1_n+1, an n+1th storage capacitor Cst_n+1, an n+1th driving transistor Tdr_n+1, an n+1th sensing transistor Tsw2_n+1, and an n+1th light emitting device ED may be formed in an n+1th pixel P_n+1.

An n+1th gate node electrode NE1_n+1 may be provided in a rear surface a substrate 101 and may be connected to a gate of the n+1th driving transistor Tdr_n+1 of an n+1th pixel P_n+1. The n+1th gate node electrode NE1_n+1 denotes a gate electrode 102 provided in the n+1th pixel among the gate electrodes 102.

That is, some of the light blocking layers 102a provided in the rear surface of the substrate 101 may be the n+1th gate node electrode NE1_n+1. The n+1th gate node electrode NE1_n+1 may be a first electrode of a touch electrode.

A gate of the n+1th driving transistor Tdr_n+1 may be connected to the n+1th gate node electrode NE1_n+1 through a gate contact hole 106 provided in a gate insulation layer 105.

In this case, a node between the gate of the n+1th driving transistor Tdr_n+1 and the n+1th gate node electrode NE1_n+1 may be an n+1th gate node DTG_n+1.

An n+1th source node electrode NE2_n+1 may be provided on the same layer as the gate of the n+1th driving transistor Tdr_n+1, may overlaps the n+1th gate node electrode NE1_n+1, and may be connected to a first electrode of an n+1th light emitting device ED_n+1.

An n+1th source node electrode NE2_n+1 denotes a source electrode 107 formed in an n+1th pixel among the source electrodes 107.

For example, some of gate layers 107a may be the n+1th source node electrode NE2_n+1. The n+1th source node electrode NE2_n+1 may be a second electrode of the touch electrode.

For example, the n+1th gate node electrode NE1_n+1 may be the first electrode of the touch electrode, the n+1th source node electrode NE2_n+1 may be the second electrode of the touch electrode, and an n+1th capacitor Cst may be formed by the n+1th gate node electrode NE1_n+1 and the n+1th source node electrode NE2_n+1.

In this case, as illustrated in FIG. 6, a buffer 103 and a gate insulation layer 105 may be provided between the gate electrode 102 and the source electrode 107. The buffer 103 and the gate insulation layer 105 may provide electrical insulation.

Therefore, at least one insulation layer may be provided between the n+1th gate node electrode NE1_n+1, which is one of the gate electrodes 102, and the n+1th source node electrode NE2_n+1, which is one of the source electrodes 107.

Because the n+1th gate node electrode NE1_n+1 is one of light blocking layers 102a and the n+1th source node electrode NE2_n+1 is one of gate layers 107a, the n+1th gate node electrode NE1_n+1th may be provided between the rear surface of the substrate 101 and the n+1th source electrode NE2n+1.

An anode AD, which is a first electrode of the n+1th light emitting device ED_n+1, may be connected to the n+1th source node electrode NE2_n+1 through the source node contact hole 109 provided in the planarization layer 108.

In this case, a node between the anode AD of the n+1th light emitting device ED_n+1 and the n+1th source node electrode EN2_n+1 may be an n+1th source node DTS_n+1.

A gate of the n+1th sensing transistor Tsw2_n+1 may be connected to a gate of the n+1th switching transistor Tsw1_n+1. For example, the gate of the n+1th sensing transistor Tsw2_n+1 and the gate of the n+1th switching transistor Tsw1_n+1 may be connected to an n+1th gate line GL_n+1.

Finally, the n+1th source node electrode NE2_n+1 provided in the n+1th pixel P_n+1 may be connected to the second sensing transistor Tsw2_n+2 provided in the second pixel P_n+2, as illustrated in FIG. 2.

Moreover, the gate of the n+1th sensing transistor Tsw2_n+1 may be connected to the gate of the n+1th switching transistor Tsw1_n+1, a first terminal of the n+1th sensing transistor Tsw2_n+1 may be connected to the nth source node electrode NE2_n provided in the nth pixel P_n, and a second terminal of the n+1th sensing transistor Tsw2_*n*+1 may be connected to the data driver 300 through the sensing line SL.

Hereinafter, a method of driving a light emitting display apparatus according to the present disclosure will be described with reference to FIGS. 1 to 9.

Figure 7:
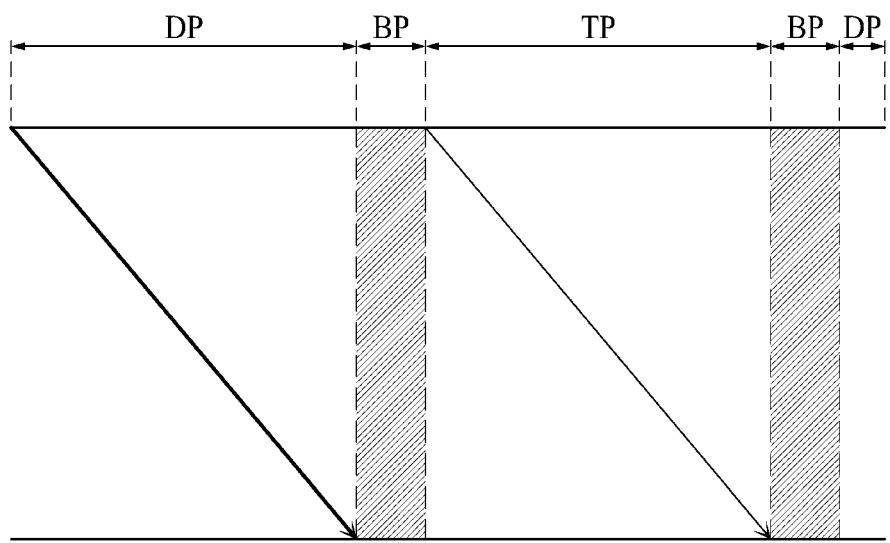
FIG. 7 is an example diagram illustrating a method of repeating a display period and a touch period in a light emitting display apparatus according to an aspect of the present disclosure.
Figure 8:
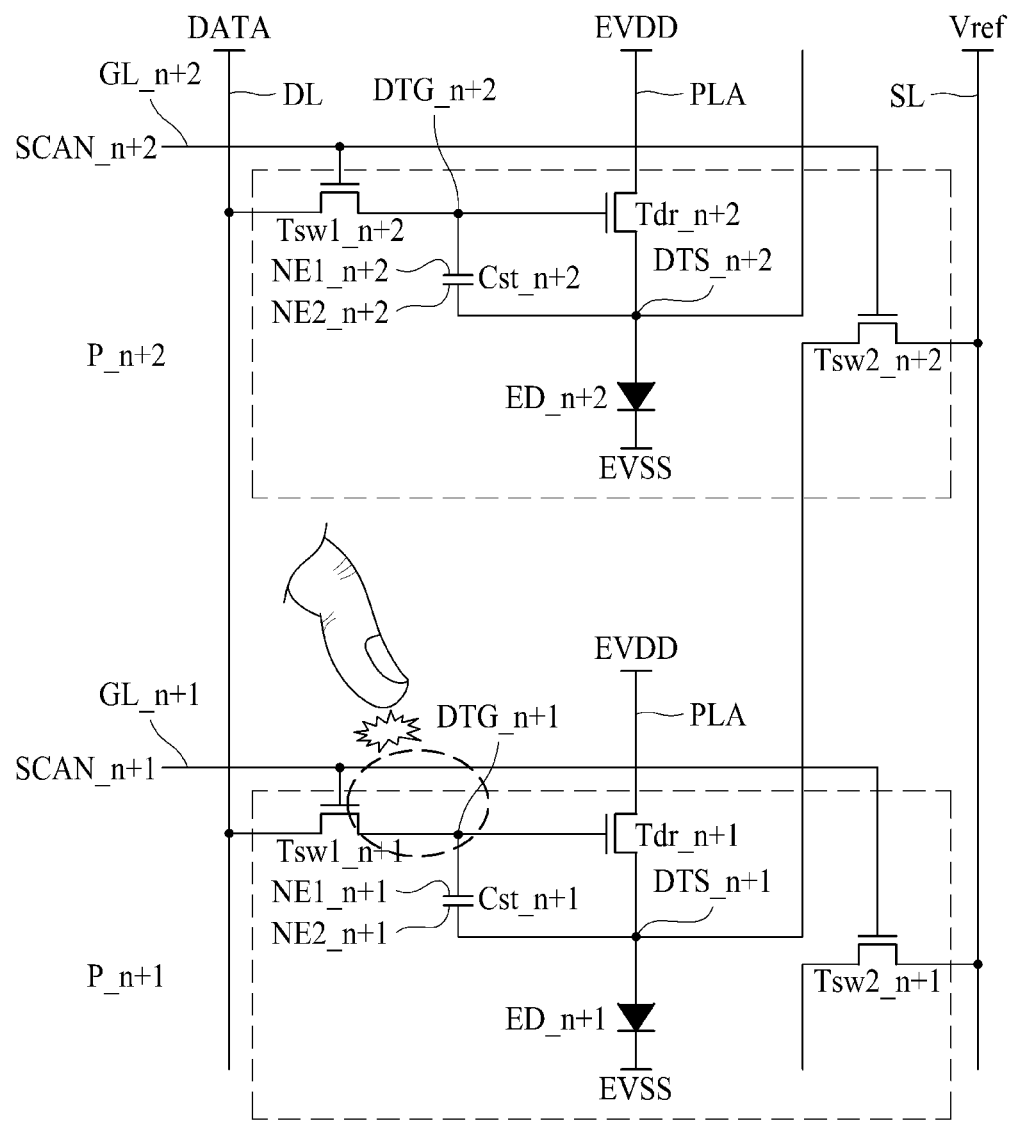
FIG. 8 is an example diagram illustrating a method of sensing a touch in a first pixel of a light emitting display apparatus according to an aspect of the present disclosure.
Figure 9:
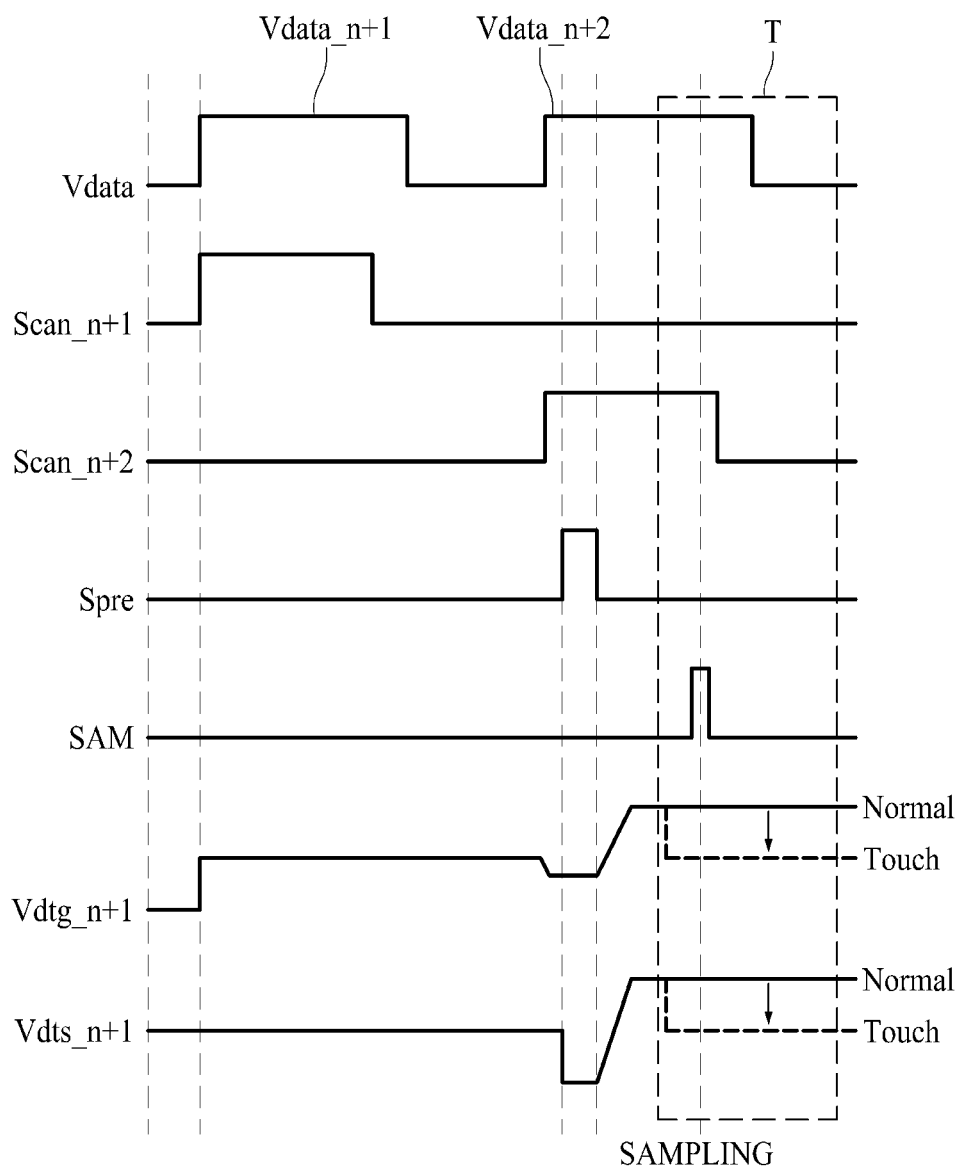
FIG. 9 is an example diagram illustrating signals used for sensing a touch in a first pixel illustrated in FIG. 8 according to an aspect of the present disclosure.

FIG. 7 is an example diagram illustrating a method of repeating a display period and a touch period in a light emitting display apparatus according to an aspect of the present disclosure, FIG. 8 is an example diagram illustrating a method of sensing a touch in an n+1th pixel of a light emitting display apparatus according to an aspect of the present disclosure, and FIG. 9 is an example diagram illustrating signals used for sensing a touch in an n+1th pixel illustrated in FIG. 8.

In the light emitting display apparatus according to the present disclosure, as illustrated in FIG. 7, a display period DP and a touch period TP may be repeated on a fixed or dynamic schedule.

During the display period DP, gate pulses are sequentially supplied from the first gate line GL1 to the gth gate line GLg and an image is displayed on the light emitting display panel.

During the touch period TP, a touch by a user or other objects (e.g., a stylus) is detected.

A blank period BP may be provided between the display period DP and the touch period TP. In the blank period BP, threshold voltages or mobility of the driving transistors Tdr may be sensed.

In this case, FIG. 7 illustrates that the display period DP and the touch period TP are repeated once, but the touch period TP may occur between at least two display periods DP. Conversely, a display period DP may occur between at least two touch periods TP.

In some aspects, pixels P are formed along a gate line GL that is referred to as a horizontal line, and the presence of a touch may be determined for all horizontal lines during the touch period TP. However, the presence of a touch may be determined only for some horizontal lines during the touch period TP based on the size and width of the user's finger.

For example, when the width of a user's finger corresponds to ten horizontal lines, the presence of a touch may be determined per five horizontal lines. In this case, it may be determined whether there is a touch for at least two horizontal lines per the five horizontal lines.

The horizontal line for determining the presence of a touch may be selected by a first switch control signal Spre and a second switch control signal SAM.

Hereinafter, as illustrated in FIG. 8, a method of sensing a touch in the n+1th pixel P_n+1 will be described.

As described above, in the light emitting display device according to the present disclosure, some of the light blocking layers 102*a* formed on the rear surface of the substrate 101 may correspond to the n+1 gate node electrode NE1_*n*+1, and the n+1 gate node electrode NE1_*n*+1 may be the first electrode of the touch electrode. Therefore, when the user's finger contacts the front surface of the substrate 101, especially when the user's finger is adjacent to the n+1th gate node electrode NE1_*n*+1, as illustrated in FIG. 8, a touch may be sensed in an n+1th horizontal line.

In one aspect, when the touch period TP starts, gate pulses are sequentially supplied from the first gate line GL1 to the gth gate line GLg. When the gate pulse is supplied to the gate line GL, the data voltages Vdata are supplied to the data lines DL.

For example, in FIG. 9, an n+1th gate pulse Scan_n+1 is supplied to the n+1th gate line, an n+2th gate pulse Scan_n+2 is supplied to the n+2th gate line, an n+1th data voltage Vdata_n+1 is supplied to the data lines when the n+1th gate pulse Scan_n+1 is supplied. For example, FIG. 9 illustrates an n+2th data voltage Vdata_n+2 is supplied to the data lines in response to receiving the n+2th gate pulse Scan_n+2.

In this case, the n+1th data voltage Vdata_n+1 and the n+2th data voltage Vdata_n+2 may have voltages corresponding to a black image.

Next, when the n+1th gate pulse Scan_n+1 is supplied, the n+1th switching transistor Tsw1_*n*+1 is turned on to supply the n+1th data voltage Vdata_n+1 to the gate of the n+1th driving transistor Tdr_n+1, and thus, a voltage is charged into the n+1th storage capacitor Cst+1.

In this case, because the n+1 gate pulse Scan_n+1 is also supplied to the gate of the n+1th sensing transistor Tsw2_*n*+1, the n+1th sensing transistor Tsw2_*n*+1 is also turned on. However, because the n+1th sensing transistor Tsw2_*n*+1 is connected to the nth source node electrode NE2_*n* provided in the nth pixel P_n, the n+1th source node electrode NE2_*n*+1 is not affected by the n+1th sensing transistor Tsw2_*n*+1.

Moreover, the n+1th source node electrode NE2_*n*+1 is connected to the n+2th sensing transistor Tsw2_*n*+2, but the n+1th gate pulse Scan_n+1 is not supplied to the n+2th sensing transistor Tsw2_*n*+2, and thus, the n+1th source node electrode NE2*n*+1 is not affected by the n+2th sensing transistor Tsw2_*n*+2.

Next, when the n+2th gate pulse Scan_n+2 is supplied, the n+2th switching transistor Tsw1_*n*+2 is turned on to supply the n+2th data voltage Vdata_n+2 to the gate of the n+2th driving transistor Tdr_n+2, and thus, a voltage is charged into the n+2th storage capacitor Cst_n+2.

In this case, because the n+2th gate pulse Scan_n+2 is also supplied to the gate of the n+2th sensing transistor Tsw2_*n*+2, the n+2th sensing transistor Tsw2_*n*+2 is also turned on.

Next, when the n+2th sensing transistor Tsw2_*n*+2 is turned on, the control driver 400 transmits a first switch control signal Spre which may turn on the first switch 323 of the touch sensing unit 320 to the touch sensing unit 320.

Accordingly, the first switch 323 is turned on, and a touch sensing voltage that is generated in the touch sensing voltage generator 321 may be supplied to the n+1th source node electrode NE2_*n*+1 through the n+2th sensing transistor Tsw2_*n*+2. Therefore, the voltage of the n+1th source node DTS_n+1 connected to the n+1th source node electrode NE2_*n*+1 (hereinafter, simply referred to as a n+1th source node voltage Vdts_n+1) may be initialized by the touch sensing voltage.

In this case, because the n+1th gate pulse Scan_n+1 is not supplied to the gate of the n+1th driving transistor Tdr_n+1, the gate of the n+1th driving transistor Tdr_n+1 is floated. Therefore, a voltage of the n+1th gate node DTG_n+1 connected to the gate of the n+1th driving transistor Tdr_n+1 (hereinafter, simply referred to as a n+1th gate node voltage Vdtg_n+1) may be changed based on the n+1th source node voltage Vdts_n+1.

Next, when the n+2th sensing transistor Tsw2_*n*+2 is turned on, the control driver 400 transmits a second switch control signal SAM which may turn on the second switch 324 of the touch sensing unit 320 to the touch sensing unit 320.

Accordingly, the second switch 324 is turned on. The user's touch T may be sensed while the second switch 324 is turned on. That is, because the converter 322 is connected to the sensing line SL based on the second switch control signal SAM, the touch sensing signal may be input to the converter 322 while the converter 322 is connected to the sensing line SL.

Therefore, a sampling period corresponds to when the second switch 324 is turned on by the second switch control signal SAM and allows the touch sensing signal to be input to the converter 322.

Next, when the second switch 324 is turned on and the user's touch does not occur, that is, in a normal state, the n+1th gate node voltage Vdtg_n+1 is not changed, and thus the n+1th source node voltage Vdts_n+1 is not changed also.

In this case, the n+1th source node voltage Vdts_n+1 may be transmitted to the converter 322 through the n+2th sensing transistor Tsw2_$n$+2. The n+1th source node voltage Vdts_n+1 corresponds to a touch sensing signal. The converter 322 converts a touch sensing signal into a touch sensing data Sdata having a digital value and transmits the touch sensing data Sdata to the control driver 400.

The control driver 400 may determine whether there is a touch by using the received touch sensing data Sdata.

As described above, when there is no touch, the n+1th source node voltage Vdts_n+1 is not changed. Accordingly, the n+1th source node voltage Vdts_n+1 has a value equal to or similar to the touch sensing voltage. In this case, the control driver 400 may determine that there is no touch in the n+1th pixel P_n+1.

Next, when the second switch 324 is turned on and a user's touch in input, that is, in a touch state, the n+1th gate node voltage Vdtg_n+1 is changed as illustrated in FIG. 9.

That is, because the n+1th gate node DTG_n+1 is floated, when there is a user's touch, the n+1th gate node voltage Vdtg_n+1 is changed based on the capacitance between the user's finger and the n+1th gate node electrode NE1_$n$+1.

When the n+1th gate node voltage Vdtg_n+1 is changed, the n+1th source node voltage Vdts_n+1 is also changed based on the n+1th gate node voltage Vdtg_n+1. For example, the n+1th source node voltage Vdts_n+1 may be changed to a voltage lower than the voltage before the touch (e. g., touch sensing voltage), as illustrated in FIG. 9.

In this case, the n+1th source node voltage Vdts_n+1 may be transmitted to the converter 322 through the n+2th sensing transistor Tsw2_$n$+2, the sensing line SL, and the second switch 324. The n+1th source node voltage Vdts_n+1 may be a touch sensing signal. The converter 322 converts the touch sensing signal into touch sensing data Sdata having a digital value and transmits the touch sensing data Sdata to the control driver 400.

The control driver 400 may determine whether there is a touch by using the received touch sensing data Sdata.

For example, the n+1th source node voltage Vdts_n+1 with a touch may have a voltage lower than the voltage without a touch. Information about the n+1th source node voltage Vdts_n+1 when there is no touch may be stored in the control driver 400. Therefore, as a result of analyzing the touch sensing data Sdata, when it is determined that the n+1 source node voltage Vdts_n+1 is lower than the voltage when there is no touch, the control driver 400 may determine that there is a touch in the n+1th pixel P_n+1.

Finally, as a result of the determination, when it is determined that there is a touch in the n+1th pixel P_n+1, the control driver 400 may calculate the position of the horizontal line, in which the n+1th pixel P_n+1 is provided, as an X coordinate.

Moreover, the control driver 400 may calculate the position of the sensing line SL, to which the touch sensing data Sdata is received, as a Y coordinates. Here, the sensing line SL is connected to the n+2th sensing transistor Tsw2_$n$+2.

Therefore, the control driver 400 may calculate the coordinates X and Y in which the touch is generated.

In some aspects, when a user's touch occurs in the n+1th pixel P_n+1, the touch sensing signal generated in the n+1th pixel P_n+1 may be transmitted to the touch sensing unit 320 of the data driver 300 through the n+2th sensing transistor Tsw2_$n$+2 provided in the n+2th pixel P_n+2.

Moreover, when a user's touch occurs in the n+1th pixel P_n+1, the voltage of the n+1th source node electrode NE2_$n$+1 may be changed due to a voltage fluctuation generated in the n+1th gate node electrode NE1_$n$+1. That is, the voltage of the n+1th source node voltage Vdts_n+1 may be changed due to a voltage fluctuation of the n+1th gate node voltage Vdtg_n+1. The control driver 400 may determine whether there is a touch in the n+1th pixel P_n+1 by using a fluctuation value of the n+1th source node voltage Vdts_n+1.

Moreover, in the light emitting display apparatus according to the present disclosure, when the n+2th data voltage Vdata_n+2 is supplied to the n+2th pixel (P_n+2), a touch of the n+1th pixel P_n+1 is sensed.

That is, when the n+2th gate pulse Scan_n+2 is supplied to the gate of the n+2th driving transistor provided in the n+2th pixel P_n+2 after the n+1th gate pulse Scan_n+1 is supplied to the gate of the n+1th driving transistor Tdr_n+1, the n+2th data voltage Vdata_n+2 is supplied to the n+2th pixel P_n+2. Moreover, when the n+2th data voltage Vdata_n+2 is supplied to the n+2th pixel P_n+2, a touch of the n+1th pixel P_n+1 may be sensed.

In the light emitting display apparatus according to the present disclosure, as described above with reference to FIG. 6, a light is output in the front direction of the substrate 101, and this method may be referred to as a bottom emission type.

In the light emitting display apparatus according to the present disclosure using the bottom emission type, the gate electrode 102 connected to the gate node DTG is disposed adjacent to the rear surface of the substrate 101 so that the voltage of the gate node DTG can be changed based on a touch.

Moreover, the source electrode 107 which configures a touch electrode with the gate electrode 102 is connected to the previous sensing transistor Tsw2.

Therefore, according to the light emitting display apparatus according to the present disclosure, a touch sensitivity may be improved, and a touch may be detected without an additional structure for touch sensing.

According to one aspect of the present disclosure, a touch electrode may be provided in the light emitting display panel even when the stacking structure and manufacturing process of the light emitting display panel are not changed significantly. Accordingly, a manufacturing process of a light emitting display panel including a touch electrode may be simplified.

Moreover, according to one aspect of the present disclosure, a gate node electrode adjacent to a front surface of a light emitting display panel which a user's finger contacts may be used as a touch electrode. Accordingly, touch sensitivity may be improved.

The above-described feature, structure, and effect of the present disclosure are included in at least one aspect of the present disclosure but are not limited to only one aspect. Furthermore, the feature, structure, and effect described in at least one aspect of the present disclosure may be implemented through combination or modification of other embodiments by those skilled in the art. Therefore, content associated with the combination and modification should be construed as being within the scope of the present disclosure.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light emitting display apparatus comprising:
   a first gate electrode disposed in a rear surface of a substrate and connected to a gate of a first driving transistor of a first pixel;
   a first source electrode disposed on the same layer as the gate of the first driving transistor, overlapping the first gate electrode, and connected to a first electrode of a first light emitting device;
   a first switching transistor connected to a first gate line; and
   a first sensing transistor,
   wherein a gate of the first sensing transistor is connected to the gate of the first switching transistor,
   wherein the first sensing transistor and the first switching transistor are disposed in a pixel,
   wherein the first gate electrode is disposed between the rear surface of the substrate and the first source electrode,
   wherein the first source electrode disposed in the first pixel is connected to a first terminal of a second sensing transistor disposed in a second pixel, and
   wherein, when a touch occurs in the first pixel, a touch sensing signal generated in the first pixel is transmitted to a data driver of the light emitting display apparatus through the second sensing transistor disposed in the second pixel.

2. The light emitting display apparatus of claim 1, wherein a front surface of the substrate is a surface on which an image is output.

3. The light emitting display apparatus of claim 1, wherein the first gate electrode is a first electrode of a touch electrode, and the first source electrode is a second electrode of the touch electrode.

4. The light emitting display apparatus of claim 1, wherein at least one insulation layer is disposed between the first gate electrode and the first source electrode.

5. The light emitting display apparatus of claim 1, wherein a first terminal of the first sensing transistor is connected to a previous source electrode disposed in a previous pixel, and
   a second terminal of the first sensing transistor is connected to the data driver.

6. The light emitting display apparatus of claim 1, wherein when a touch occurs in the first pixel, a voltage of the first source electrode is changed due to a voltage fluctuation generated in the first gate electrode.

7. The light emitting display apparatus of claim 1, wherein when a second data voltage is supplied to the second pixel, a touch is sensed in the first pixel.

8. The light emitting display apparatus of claim 1, wherein after a first gate pulse is supplied to the gate of the first driving transistor, a second gate pulse is supplied to a gate of a second driving transistor disposed in the second pixel, and
   when the second gate pulse is supplied to the gate of the second driving transistor disposed in the second pixel, a touch of the first pixel is sensed.

9. A display panel comprising, comprising:
   a substrate;
   a plurality of pixels disposed on the substrate, wherein a first pixel of the plurality of pixels includes a driving transistor for causing a light emitting element to emit light, a switching transistor, and a sensing transistor, and a second pixel of the plurality of pixels includes a driving transistor, a switching transistor, and a sensing transistor; and
   a sensing circuit configured to detect a touch input into the first pixel based on a voltage at a node in the first pixel,
   wherein a gate of the sensing transistor in the first pixel is connected to a gate of the switching transistor in the first pixel, and a gate of the sensing transistor in the second pixel is connected to a gate of the switching transistor in the second pixel,
   wherein a source of the driving transistor in the first pixel is connected to the sensing transistor in the second pixel, and
   wherein, when a touch occurs in the first pixel, a touch sensing signal generated in the first pixel is transmitted through the sensing transistor in the second pixel.

10. The display panel of claim 9, wherein a gate of the driving transistor is configured to be floated to detect the touch input during a sampling period.

11. The display panel of claim 9, wherein the second pixel adjacent to the first pixel is configured to provide the voltage in the first pixel to a control driver for detecting the touch input.

12. The display panel of claim 9, wherein the node is disposed between the source of the driving transistor and the light emitting element.

13. The display panel of claim 12, wherein a scan signal of the second pixel is configured to cause the second pixel sense the voltage at the node.

* * * * *